US008688332B2

(12) United States Patent
Reiners et al.

(10) Patent No.: US 8,688,332 B2
(45) Date of Patent: Apr. 1, 2014

(54) MANAGEMENT SYSTEM INCORPORATING PERFORMANCE AND DETECTION DATA

(75) Inventors: Eric A. Reiners, Washington, IL (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 325 days.

(21) Appl. No.: 13/090,738

(22) Filed: Apr. 20, 2011

(65) Prior Publication Data

US 2012/0271504 A1 Oct. 25, 2012

(51) Int. Cl.
*G06F 7/70* (2006.01)

(52) U.S. Cl.
USPC .......... 701/50; 701/33.4

(58) Field of Classification Search
USPC .......... 701/33.1–33.9, 50
See application file for complete search history.

(56) References Cited

U.S. PATENT DOCUMENTS 4,653,316 A 3/1987 Fukuhara
4,958,306 A 9/1990 Powell et al.
5,375,663 A 12/1994 Teach
6,064,926 A 5/2000 Sarangapani et al.
6,615,648 B1 9/2003 Ferguson et al.
7,272,474 B1 9/2007 Stentz et al.
7,562,563 B2 7/2009 Wee
7,594,441 B2 9/2009 Gudat et al.
7,697,727 B2 4/2010 Xu et al.
7,801,333 B2 9/2010 Laurent et al.
7,840,342 B1 11/2010 Breed
2008/0127529 A1 6/2008 Stanek et al.
2008/0208416 A1* 8/2008 Yuet et al. .......... 701/50
2010/0280751 A1 11/2010 Breed
2012/0215379 A1* 8/2012 Sprock et al. .......... 701/2

FOREIGN PATENT DOCUMENTS

EP 1571515 9/2005

* cited by examiner

*Primary Examiner* — Thomas Black
*Assistant Examiner* — Luke Huynh
(74) *Attorney, Agent, or Firm* — Finnegan, Henderson, Farabow, Garrett & Dunner LLP

(57) ABSTRACT

A management system for use at a worksite is disclosed. The management system may have at least one object detection sensor configured to generate a first signal indicative of a feature of a roadway traversed by the mobile machine, a positioning device configured to generate a second signal indicative of a position of the mobile machine, and at least one performance sensor configured to generate a third signal indicative of a performance parameter of the mobile machine as the mobile machine traverses the feature. The management system may also have a controller configured to determine a surface condition of the roadway based on the first signal, index the surface condition to a particular location on the roadway based on the second signal, and generate a map of the roadway providing a representation of the surface condition and the performance parameter.

16 Claims, 3 Drawing Sheets

MANAGEMENT SYSTEM INCORPORATING PERFORMANCE AND DETECTION DATA

TECHNICAL FIELD

The present disclosure is directed to a management system and, more particularly, to a worksite management system incorporating mapping and modeling of machine performance and object detection data.

BACKGROUND

Mining, construction, and other large scale excavating operations require fleets of digging, loading, and hauling machines to remove and transport excavated material such as ore or overburden from an area of excavation to multiple different destinations at a common worksite. For such an operation to be profitable, the fleets of machines must be productively and efficiently operated. Many factors can influence productivity and efficiency at a worksite including, among other things, roadway conditions over which the machines travel, and surface maintenance activities of the roadways. It can be difficult, however, to determine when a roadway condition affects machine performance, when maintenance of the roadway should be performed, and which maintenance activities most affect worksite profitability.

Historically, roadway maintenance has been managed through the use of mobile inspection apparatus that automatically maps a surface of the roadway as the apparatus traverses the roadway. U.S. Pat. No. 7,562,563 issued to Wee on Jul. 21, 2009 (the '563 patent) describes an exemplary apparatus. Specifically, the '563 patent discloses an apparatus for automatically inspecting a road surface pavement condition. The apparatus includes a photographing unit, a rut measuring unit, a flatness measuring unit, a data analysis and storage unit, a traveling noise measuring unit, and a position decision unit all equipped within a mobile vehicle. When the vehicle runs along a roadway, photographs of the road are taken, ruts in the road are measured, a flatness of the roadway is measured, and a traveling noise of the roadway is measured. All of the measured values are then indexed according to location, and subsequently analyzed for use in determining a state of the roadway and maintenance and repair of the roadway.

Although the apparatus of the '563 patent may help to determine a status of a roadway, it may be less than optimal. In particular, the apparatus does not consider performance parameters of machines that may use the roadway, how those machines are affected by roadway conditions, or potential long term effects on operating and repair costs of the machine associated with maintenance of the roadway.

The mapping system of the present disclosure is directed to overcoming one or more of the problems set forth above and/or other problems of the prior art.

SUMMARY

In one aspect, the present disclosure is directed toward a worksite management system. The worksite management system may have at least one object detection sensor located onboard a mobile machine and configured to generate a first signal indicative of surface condition of a roadway traversed by the mobile machine, a positioning device located onboard the mobile machine and configured to generate a second signal indicative of a position of the mobile machine, and at least one performance sensor located onboard the mobile machine and configured to generate a third signal indicative of a performance parameter of the mobile machine as the mobile machine traverses the surface condition. The worksite management system may also have a controller in communication with the at least one object detection sensor, the positioning device, and the at least one performance sensor. The controller may be configured to determine a surface condition of the roadway based on the first signal, index the surface condition to a particular location on the roadway based on the second signal, and generate a map of the roadway providing a representation of the surface condition and the performance parameter.

In another aspect, the present disclosure is directed toward a method of managing a worksite. The method may include detecting a surface condition of a roadway traversed by a mobile machine, determining a position of the mobile machine, and indexing the surface condition to the position of the mobile machine. The method may also include sensing a performance parameter of the mobile machine as the mobile machine traverses the surface condition, and generating a map of the roadway providing a representation of the surface condition and the performance parameter.

DETAILED DESCRIPTION

Figure 1:
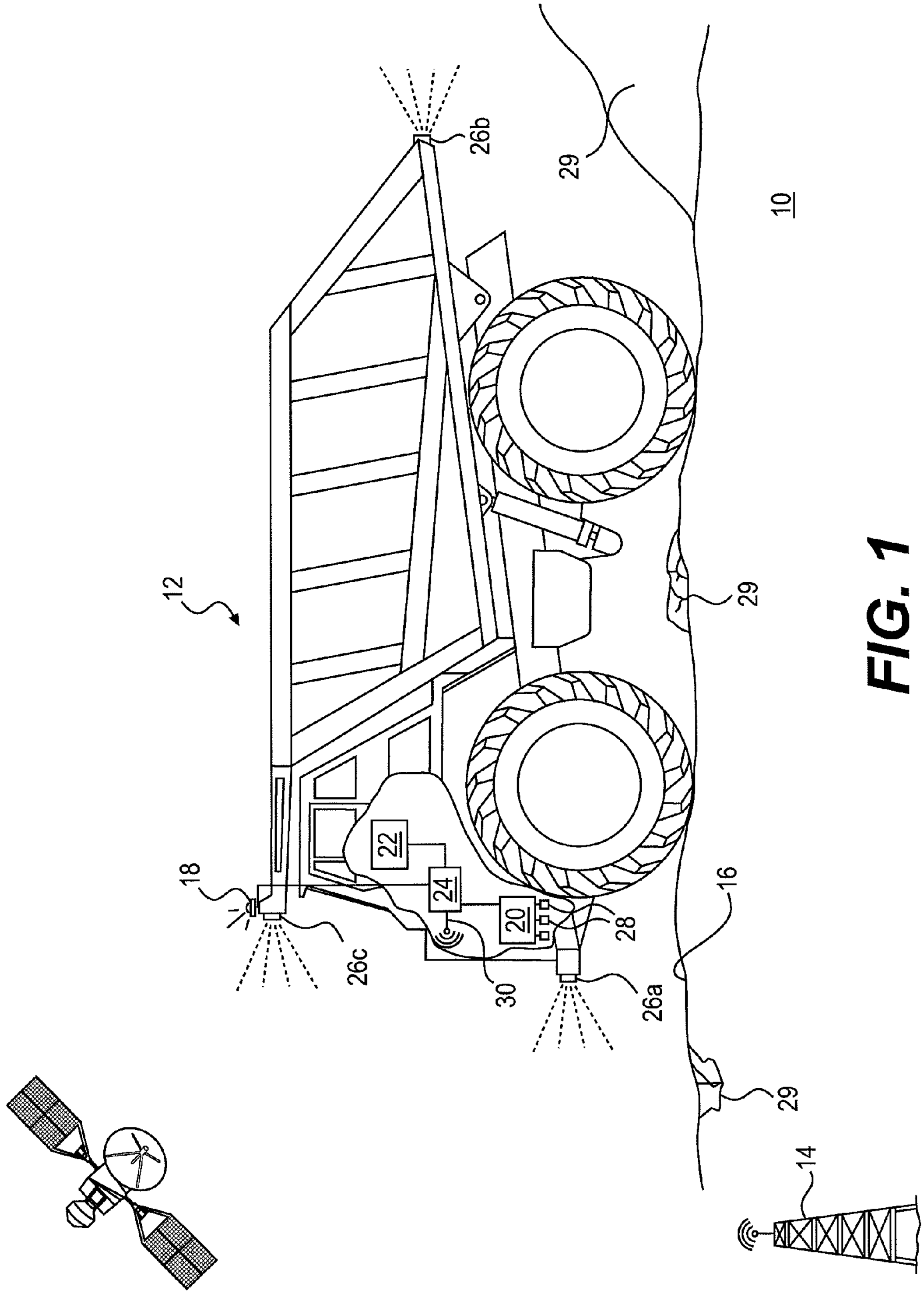
FIG. 1 is a schematic and diagrammatic representation of an exemplary disclosed machine.

FIG. 1 shows a worksite 10 such as, for example, an open pit mining operation. As part of the mining function, different machines 12 may operate at or between various locations of the worksite 10. These machines 12 may include, among others, digging machines, loading machines, and hauling machines (shown in FIG. 1). Each of the machines 12 at worksite 10 may be in communication with each other and/or with a central station 14 by way of wireless communication to transmit and receive operational data and instructions.

A digging machine may refer to any machine that reduces material at worksite 10 for the purpose of subsequent operations (i.e. for blasting, loading, and hauling operations). Examples of digging machines may include excavators, backhoes, dozers, drilling machines, trenchers, drag lines, etc. Multiple digging machines may be co-located within a common area at worksite 10 and may perform similar functions. As such, under normal conditions, similar co-located digging machines should perform about the same with respect to productivity and efficiency when exposed to similar site conditions.

A loading machine may refer to any machine that lifts, carries, and/or loads material that has been reduced by the digging machine onto hauling machines. Examples of a loading machines may include wheeled or tracked loaders, front shovels, cable shovels or any other similar machines. One or more loading machines may operate within common areas of worksite 10 to load reduced materials onto hauling machines. Under normal conditions, similar co-located loading machines should perform about the same with respect to productivity and efficiency when exposed to similar site conditions.

A hauling machine may refer to any machine that carries the excavated materials between different locations within worksite 10. Examples of hauling machines may include articulated trucks, off-highway trucks (shown in FIG. 1), on-highway dump trucks, wheel tractor scrapers, or any other similar machine. Laden hauling machines may carry overburden from areas of excavation within worksite 10, along roadways 16 to various dump sites, and return to the same or different excavation areas to be loaded again. Under normal conditions, similar co-located hauling machines should perform about the same with respect to productivity and efficiency when exposed to similar site conditions.

It should be noted that, although the machine 12 depicted in FIG. 1 may embody a hauling machine, the following description may be equally applied to any machine operating at worksite 10. Machine 12 may record and transmit data to central station 14 during its operation. This data may include machine identification data, performance data, and other data, all or some of which may be automatically monitored from onboard machine 12 and/or manually observed and input by machine operators.

Identification data may include machine-specific data, operator-specific data, and/or location-specific data. Machine-specific data may consist of identification data associated with a type of machine (e.g., digging, loading, hauling, etc.), a make and model of machine (e.g., Caterpillar 797 OHT), a machine manufacture date or age, a usage or maintenance/repair history, etc. Operator-specific data may include an identification of a current operator, information about the current operator (e.g., a skill or experience level, an authorization level, an amount of time logged during a current shift, a usage history, etc.), a history of past operators, etc. Site-specific data may include a task currently being performed by the operator, a location authorization at worksite 10, a current location at worksite 10, a location history, a material composition at a particular area of worksite 10, etc.

Performance data may include current and historic data associated with performance of machine components at worksite 10. Performance data may include, for example, payload, engine and/or ground speed or acceleration, fluid characteristics (e.g., levels, contamination, viscosity, temperature, pressure etc.), fuel consumption, exhaust emissions, braking conditions, transmission characteristics (e.g., gear selection, speed, torque, etc.), air and/or exhaust pressures and temperatures, engine injection and/or ignition timings, wheel torque and/or slip, rolling resistance, strut pressure, system voltage, etc. Some performance data may be monitored (i.e., sensed) directly, while other data may be derived or calculated from the monitored parameters.

To facilitate the collection, recording, and transmitting of data from machines 12 at worksite 10 to central station 14, each machine 12 may include a positioning device 18, an onboard acquisition module 20, an operator interface module 22, and a communication module 24. Machine position information, together with data received by acquisition and operator interface modules 20, 22 may be sent offboard to central station 14 by way of communication module 24. It is contemplated that additional or different modules may be included onboard machine 12, if desired.

Positioning device 18 may be configured to determine a position of machine 12 and to generate signals indicative thereof. For example, positioning device 18 could form a portion of a Global Positioning System (GPS), an Inertial Reference System (IRS), a local tracking system, or another known locating system that receives or determines positional information associated with machine 12. Positioning device 18 may be in communication with central station 14 via communication module 24 to convey signals indicative of the received or determined positional information for further processing.

Data acquisition module 20 may include at least one object detection sensor 26 and at least one performance sensor 28 distributed throughout machine 12 and configured to gather onboard performance data and offboard environmental data associated with operation of machine 12 at worksite 10. It is contemplated that any number of sensors 26, 28 may be included within data acquisition module 20 and located at any position onboard machine 12.

Object detection sensors 26 may include, for example, short range sensors **26*a*, medium range sensors 26*b*, and/or long range sensors 26*c* located at different positions around machine 12 (e.g., in a travel direction at a front end and/or back end of machine 12). Each object detection sensor 26 may be a device that detects and ranges objects (e.g., undesired features 29 of roadway 16 such as pot holes, rocks, slopes, or other deviations from a desired contour or composition), for example a LIDAR (light detection and ranging) device, a RADAR (radio detection and ranging) device, a SONAR (sound navigation and ranging) device, a camera, or another sensing device known in the art. In one example, object detection sensor 26 may include an emitter that emits a detection beam to a particular zone within a detection range around machine 12, and an associated receiver that receives a reflection of that detection beam. Based on characteristics of the reflected beam, a distance and a direction from an actual sensing location of object detection sensor 26 on machine 12 to a portion of the sensed object within the particular zone may be determined. Object detection sensor 26 may then generate signals corresponding to the distance, direction, size, and/or shape of features 29, and direct the signals to communication module 24 for subsequent communication to central station 14**.

Performance sensors 28 may be associated with a power source (not shown), a transmission (not shown), a traction device, an undercarriage, a work implement, an operator station, and/or other components and subsystems of machine 12. These sensors may embody, for example, temperature sensors, pressure sensors, speed sensors, load cells, flow sensors, torque sensors, and other types of sensors configured to gather performance data from each of the associated components and subsystems as machine 12 traverses features 29 of roadway 16. This performance data may be indicative of an effect features 29 have on components of machine 12 when machine 12 traverses features 29. The performance data may be directed from sensors 28 to communication module 24 for subsequent communication to central station 14.

Operator interface module 22 may be located onboard machine 12 for manual recording of data. The data received via interface module 22 may include observed information associated with worksite 10, machine 12, and/or the operator. For example, the observed data may be associated with features 29 of roadway 16 over which machine 12 is passing, an observed performance of machine 12 during travel over features 29 (e.g., an excessive vibration or acceleration), or an identity and start time of the operator. The operator may record this information into a physical or electronic log book (not shown) located within machine 12 during or after a work shift. In some cases, data from operator interface module 22 may automatically be combined with data captured by acquisition module 20 and directed offboard machine 12 via communication module 24. For example, operator input regarding a significant jolt experienced by the operator during machine travel over a particular feature 29 of roadway 16 may be coordinated with input from object detection sensors 26 regarding feature 29, a geographical location of machine 12 received via positioning device 18, and a strut pressure measured by performance sensors 28.

Communication module 24 may include any device that facilitates communication of data between machines 12 and central station 14. Communication module 24 may include hardware and/or software that enables sending and/or receiving data through a wireless communication link 30. It is contemplated that, in some situations, the data may be transferred to central station 14 through a direct data link (not shown), or downloaded from machine 12 and uploaded to central station 14, if desired. It is also contemplated that, in some situations, the data automatically monitored by acquisition module 20 may be electronically transmitted, while the operator observed data may be communicated to central station 14 by a voice communication device, such as a two-way radio (not shown).

Communication module 24 may also have the ability to record the monitored and/or manually input data. For example, communication module 24 may include a data recorder (not shown) having a recording medium (not shown). In some cases, the recording medium may be portable, and data may be transferred from machine 12 to central station 14 using the portable recording medium.

Figure 2:
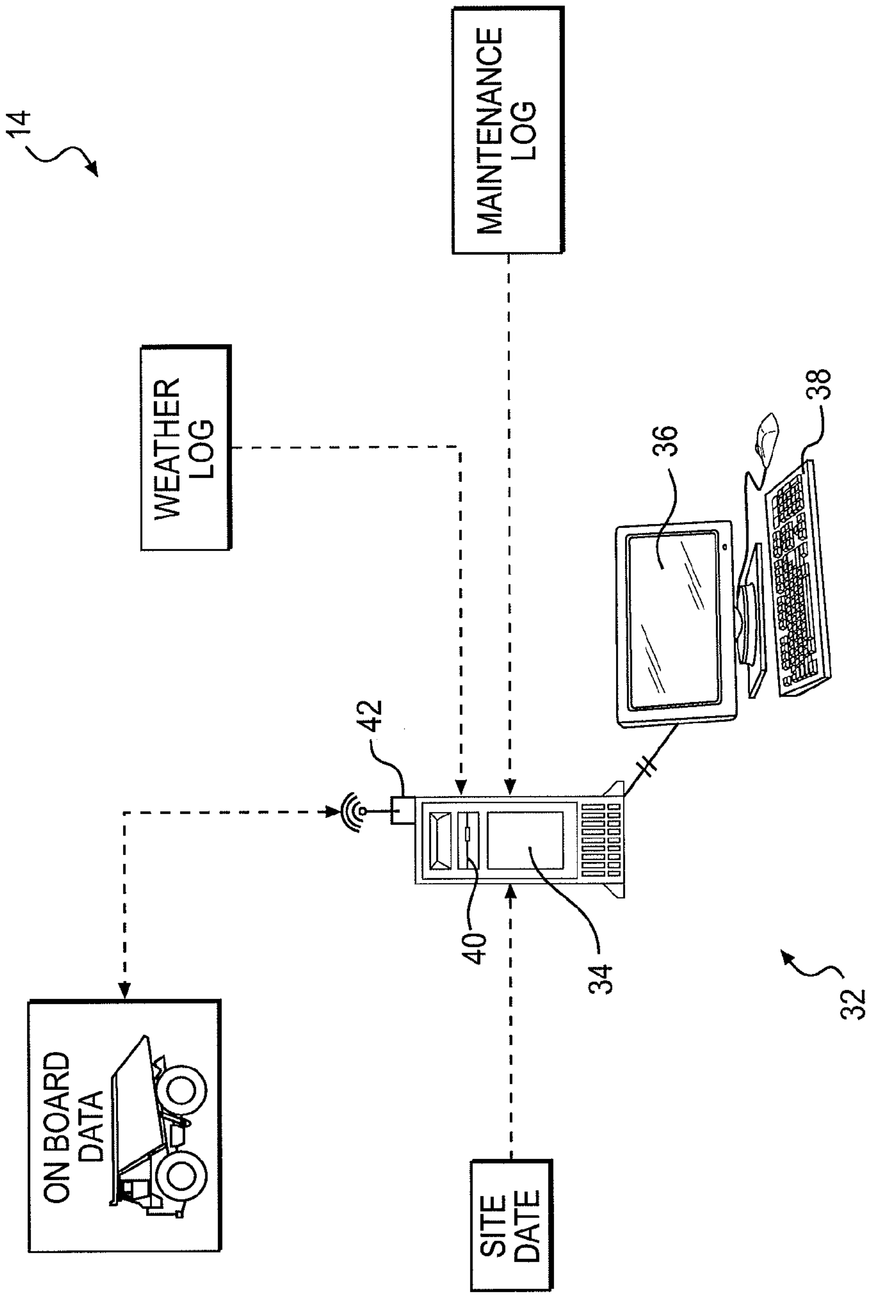
FIG. 2 is a schematic illustration of an exemplary disclosed worksite management system that may be used in conjunction with the machine of FIG. 1.

FIG. 2 is a schematic illustration of a worksite management system 32 configured to receive and analyze the data communicated to central station 14 from machines 12 and from other sources. Worksite management system 32 may include an offboard controller 34 configured to process data from a variety of sources and execute performance management at worksite 10. For the purposes of this exemplary system, controller 34 may be primarily focused at improving profitability of the operations performed at worksite 10.

Controller 34 may include any type of computer or a plurality of computers networked together. Controller 34 may be located proximate the mining operation of worksite 10 or may be located at a considerable distance remote from the mining operation, such as in a different city or even a different country. It is also contemplated that computers at different locations may be networked together to form controller 34, if desired.

Controller 34 may include among other things, a console 36, an input device 38, a storage device 40, and a communication interface 42. Console 36 may be any appropriate type of computer display device that provides a graphics user interface (GUI) to display results and information to operators and other users of worksite management system 32. Input device 38 may be provided for operators to input information into controller 34. Input device 38 may include, for example, a keyboard, a mouse, or another computer input device. The storage device 40 may be any type of device configured to read/write information from/to a portable recording medium, for example, a floppy disk, a CD, a DVD, or a flash memory read/write device. Storage device 40 may be provided to transfer data into and out of controller 34 using the portable recording medium. The storage media could alternatively or additionally include other means to store data within controller 34 such as a hard disk, if desired. The stored data may include, among others, site, machine, and/or operator related data. Communication interface 42 may enable controller 34 to be remotely accessed through computer networks, and means for data from remote sources (e.g., from machines 12) to be transferred into and out of controller 34. Communication interface 42 may contain network connections, data link connections, and/or antennas configured to receive wireless data.

Data may be transferred to controller 34 electronically or manually. Electronic transfer of data includes the transfer of data using the wireless capabilities or the data link of communication interface 42. Data may also be electronically transferred into controller 34 through the portable recording medium using storage device 40. Manually transferring data into controller 34 may include communicating data to a control system operator in some manner, who may then manually input the data into controller 34 by way of, for example, input device 38. The data transferred into controller 34 may include machine identification data, roadway feature data, machine performance data, location data, and other data. The other data may include for example, weather data (current, historic, and forecast), machine maintenance and repair data, site data such as survey information or soil test information, and other data known in the art.

Controller 34 of performance management system 32 may analyze the data and present results to a user thereof by way of console 36. The results may include an electronic map of roadway features 29, including a size, type, and/or shape of each feature 29, a location of features 29, machine performance data gathered during machine travel over features 29, and/or operator input data associated with features 29. The results may also include an analysis of an effect on components of machine 12 caused by roadway features 29, for example a load on wear components (e.g., brakes, tires, actuators, liners, seals, inserts, etc.) of machine 12; different options and costs for maintaining roadway 16 in view of features 29; and/or estimations regarding future operating and repair costs of machine 12 in view of features 29. The results may additionally include a profitability of worksite 10 associated with the different maintenance options, and/or a recommendation regarding the options. The results may be specific to individual machines 12 or, alternatively, specific only to a type of machine 12, for example to digging, loading, or hauling machines.

Figure 3:
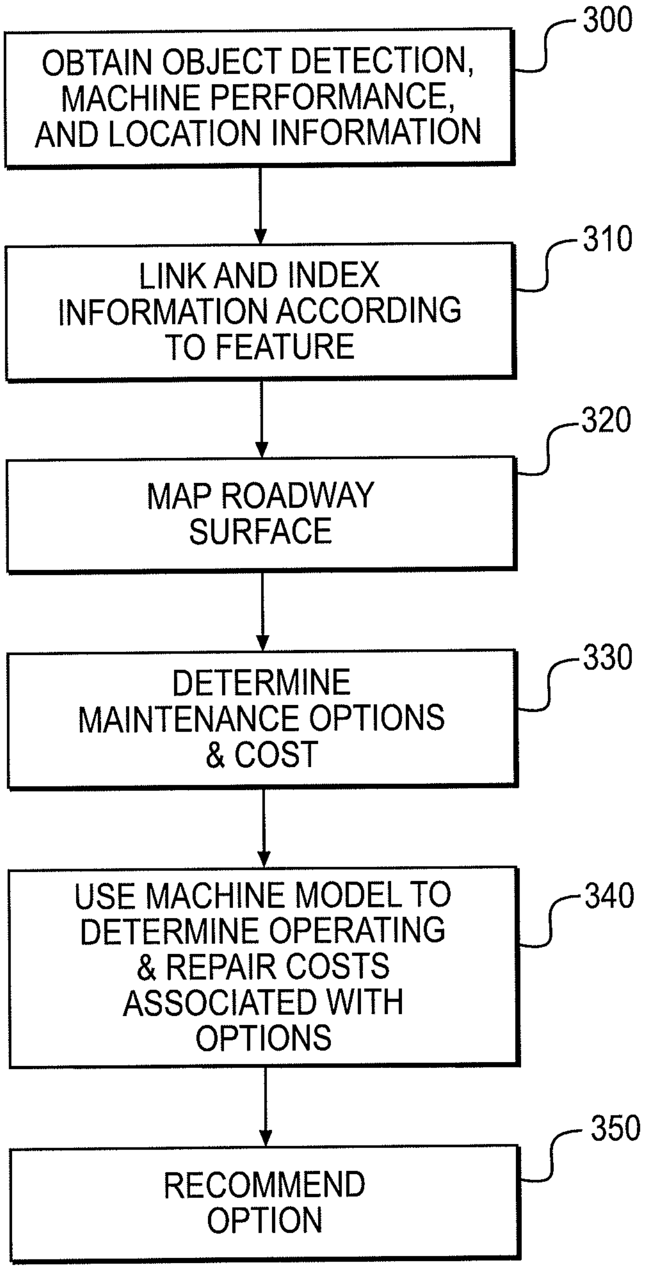
FIG. 3 is a flowchart depicting an exemplary operation that may be executed by the worksite management system of FIG. 2.

FIG. 3 is a flowchart depicting an exemplary operation performed by worksite management system 32. FIG. 3 will be discussed in more detail below to further illustrate worksite management system 32 and its operation.

INDUSTRIAL APPLICABILITY

The disclosed system may provide a profitable method of managing worksite performance. In particular, the disclosed system may manage profitability at a worksite by gathering and mapping roadway data measured from onboard mobile machines at the worksite and by developing and recommending different roadway maintenance options that are based on long-term estimates of productivity and cost. The operation of worksite management system 32 will now be explained.

As illustrated in FIG. 3, during operation at worksite 10, data from various sources including digging, loading, and hauling machines 12 and from operators thereof, may be collected by worksite management system 32 (Step 300). The data may include, among other things, machine location data obtained by positioning device 18, roadway surface condition data associated with features 29 and obtained by object detection sensors 26, performance data obtained by performance sensors 28 during travel of machine 12 over features 29, and other data such as machine identification data, site data, weather data, and machine maintenance data. Controller 34 may link the data from the different sources together by indexing the data according to particular roadway features 29 (Step 310). For example, a particular feature 29 may be detected and characteristics of that feature 29 linked together with a specific location on roadway 16, machine performance data (e.g., strut pressure and/or rolling resistance) sensed and recorded during travel over the feature 29, a type and/or identity of the machine 12 from which the performance data was recorded, and worksite related data (e.g., weather conditions, soil composition at the feature locations, operator data, etc.). The linked and indexed data may then be used to generate a corresponding electronic map of roadway 16 (Step 320). The map may provide, among other things, a representation of roadway surface conditions, including the size, type, shape, and location of features 29, as well as performance parameters measured as machine 12 traveled across features 29.

After completion of Step 320, controller 34 may be configured to determine different maintenance options for addressing each particular feature 29 of roadway 16 (Step 330). For example, controller 34 may determine a first option that includes taking no action at all, a second option that includes a temporary correction of feature 29, and a third option that includes a more permanent correction. In a particular example where feature 29 consists of a pothole, the temporary correction could be to fill in the pothole with local material thereby quickly returning the particular section of roadway 16 to a relatively smooth surface, while the more permanent correction may be to completely rebuild roadway 16 at the location of the pothole to inhibit future formation of potholes. Any number of maintenance options may be determined by controller 34, as desired. Along with the different maintenance options, controller 34 may also be configured to determine a corresponding implementation cost for each maintenance option. In one example, controller 34 may be configured to determine the different maintenance options and associated implementation costs by referencing a type, size, and/or location of feature 29 with a lookup map stored in the memory of controller 34. It is contemplated, however, that controller 34 may determine the different maintenance options and/or associated implementation costs through other methods, if desired.

It should be noted that, in addition to each maintenance option having a different upfront cost of implementation, each option may also differently affect a long term operating and repair cost of machines 12. For example, although the first option (i.e., not doing anything to correct feature 29) may have a lower upfront cost (i.e., the first option may have no implementation cost at all), the first option may also result in significant wear on machine components each time machine 12 traverses feature 29. In addition, machine 12 may need to move slower over feature 29 and/or may have greater resistance to travel by machine 12, thereby reducing productivity and decreasing efficiency. Similarly, the more permanent correction, although significantly more expensive to implement than other options, may provide a smooth travel surface that results in low rolling resistance for machine 12, which may allow for machine 12 to travel faster with greater fuel efficiency. Accordingly, controller 34 may utilize the electronic map of roadway 16 as input to a model of machine 12 to estimate future operating and repair costs associated with each maintenance option (Step 340).

The machine model used by controller 34 to estimate future operating and repair costs of machine 12 may include one or more equations, algorithms, maps, and/or subroutines stored in the memory of controller 34. Each of the equations, algorithms, maps, and/or subroutines may be developed during design, testing, and/or manufacture of machine 12 and be applicable to all machines 12 at worksite 10 or applicable to only particular groups of machines 12 (e.g., applicable to only digging machines, only loading machines, or only hauling machines). It is also contemplated that the model may alternatively be specific to individual machines 12, if desired, and/or periodically updated or uniquely tuned based on real time and/or historic operating conditions. The operating and repair costs estimated by the machine model may then be used by controller 34 to display and/or recommend a particular maintenance option to the user of worksite management system 32 (Step 350). Any strategy may be used by controller 34 to rank and recommend the different maintenance options including, for example, generating a greater profitability over the lifetime of machine 12.

Because the disclosed worksite management system may consider performance parameters measured from onboard particular machines as the machines traverse features of a worksite roadway, the system may be capable of accurately determining loads placed on machine components by the features. In addition, the performance parameters, along with information associated with the features, may be used to model potential long term effects on the machine associated with maintenance of the roadway and provide analysis useful in determining how to profitably maintain the roadway.

It will be apparent to those skilled in the art that various modifications and variations can be made in the disclosed worksite management system without departing from the scope of this disclosure. Other embodiments will be apparent to those skilled in the art from consideration of the specification and practice of the worksite management system. It is intended that the specification and examples be considered as exemplary only, with a true scope being indicated by the following claims.

What is claimed is:

1. A worksite management system, comprising:

at least one object detection sensor located onboard a mobile machine and configured to generate a first signal indicative of a feature of a roadway traversed by the mobile machine;

a positioning device located onboard the mobile machine and configured to generate a second signal indicative of a position of the mobile machine;

at least one performance sensor located onboard the mobile machine and configured to generate a third signal indicative of a performance parameter of the mobile machine as the mobile machine traverses the feature; and a controller in communication with the at least one object detection sensor, the positioning device, and the at least one performance sensor, the controller configured to:

determine a surface condition of the roadway based on the first signal;

index the surface condition to a particular location on the roadway based on the second signal;

generate a map of the roadway providing a representation of the surface condition and the performance parameter; and use a model of the mobile machine to determine loads on wear components of the mobile machine and estimate a condition of the mobile machine at a future point in time based on the map.

2. The worksite management system of claim 1, wherein the controller is located offboard the mobile machine and is in communication with multiple mobile machines at a common worksite, the controller being configured to generate the map based on information received from the multiple mobile machines.

3. The worksite management system of claim 1, wherein the controller is further configured to use the model to estimate the condition of the mobile machine at the future point in time based on different optional maintenance scenarios associated with the surface condition.

4. The worksite management system of claim 3, wherein the controller is further configured to make an estimation of a repair cost of the mobile machine at the future point in time, an implementation cost of each of the different maintenance scenarios, and a machine operating cost associated with each of the different maintenance scenarios.

5. The worksite management system of claim 4, wherein the controller is further configured to provide a roadway maintenance recommendation based on the estimation.

6. The worksite management system of claim 1, further including an operator input device configured to receive input from an operator of the mobile machine regarding the surface condition, wherein the controller is in further communication with the operator input device and configured to generate the map based on the input.

7. The worksite management system of claim 1, wherein the at least one object detection sensor is one of a LIDAR, RADAR, SONAR, or camera sensor.

8. The worksite management system of claim 1, wherein the at least one performance sensor is one of a strut pressure sensor, a wheel torque sensor, a rolling resistance sensor, a wheel slip sensor, and a fuel efficiency sensor.

9. A method of managing a worksite, comprising:

detecting a surface condition of a roadway traversed by a mobile machine;

determining a position of the mobile machine;

indexing the surface condition to the position of the mobile machine;

sensing a performance parameter of the mobile machine as the mobile machine traverses the surface condition;

generating a map of the roadway providing a representation of the surface condition and the performance parameter; and using a model of the mobile machine to determine loads on wear components of the mobile machine and estimate a condition of the mobile machine at a future point in time based on the map.

10. The method of claim 9, wherein detecting the surface condition includes detecting the surface condition using one of a LIDAR, RADAR, SONAR, or camera technology.

11. The method of claim 9, wherein the at least one performance parameter is associated with a strut pressure, a wheel torque, a rolling resistance, a wheel slip, and a fuel efficiency.

12. The method of claim 9, wherein generating the map includes providing a representation of surface conditions detected from onboard multiple mobile machines and performance parameters sensed from onboard the multiple mobile machines.

13. The method of claim 9, wherein using the model to estimate the condition of the mobile machine at the future point in time includes using the model to estimate the condition of the mobile machine based on different optional maintenance scenarios associated with the surface condition.

14. The method of claim 13, further including making an estimation of a repair cost of the machine at the future point in time, an implementation cost of each of the different maintenance scenarios, and a machine operating cost associated with each of the different maintenance scenarios.

15. The method of claim 14, further including providing a roadway maintenance recommendation based on the estimation.

16. A mobile machine, comprising:

at least one onboard object detection sensor configured to generate a first signal indicative of a feature of a roadway traversed by the mobile machine;

an onboard positioning device configured to generate a second signal indicative of a position of the mobile machine;

at least one onboard performance sensor configured to generate a third signal indicative of a performance parameter of the mobile machine as the mobile machine traverses the feature; and an offboard controller in communication with the at least one object detection sensor, the positioning device, and the at least one performance sensor, the controller configured to:

determine a surface condition of the roadway based on the first signal;

index the surface condition to a particular location on the roadway based on the second signal;

generate a map of the roadway providing a representation of the surface condition and the performance parameter;

use a model of the mobile machine to determine loads on wear components of the mobile machine and a condition of the mobile machine at a future point in time based on the map and different optional maintenance scenarios associated with the surface condition;

make an estimation of a repair cost of the mobile machine at the future point in time, an implementation cost of each of the different maintenance scenarios, and a machine operating cost associated with each of the different maintenance scenarios; and provide a roadway maintenance recommendation based on the estimation.

* * * * *